P. A. ANDERSON.
PISTON RING.
APPLICATION FILED AUG. 12, 1919.

1,392,614.

Patented Oct. 4, 1921.

WITNESSES

INVENTOR
Per August Anderson
BY
ATTORNEYS

UNITED STATES PATENT OFFICE.

PER AUGUST ANDERSON, OF NEW YORK, N. Y.

PISTON-RING.

1,392,614.     Specification of Letters Patent.     Patented Oct. 4, 1921.

Application filed August 12, 1919. Serial No. 317,017.

*To all whom it may concern:*

Be it known that I, PER AUGUST ANDERSON, a citizen of the United States, and resident of the borough of Manhattan, city, county, and State of New York, have made certain new and useful Improvements in Piston-Rings, of which the following is a specification.

My invention relates to piston rings and has for its object to provide a novel and simple arrangement whereby the efficiency of the ring as a piston packing is increased. My invention particularly contemplates the provision of a construction whereby piston rings which have become worn and which ordinarily would be discarded, may be restored to a maximum efficiency in a simple and economical manner. My invention will be fully described hereinafter and the features of novelty will be pointed out in the appended claims.

Figure 1:
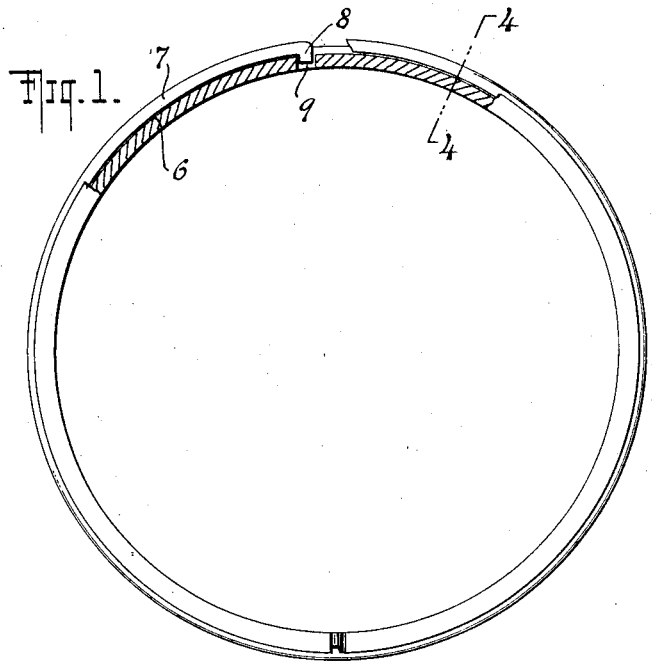
Figure 2:
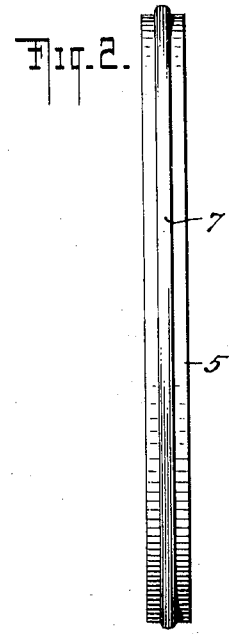
Figure 3:
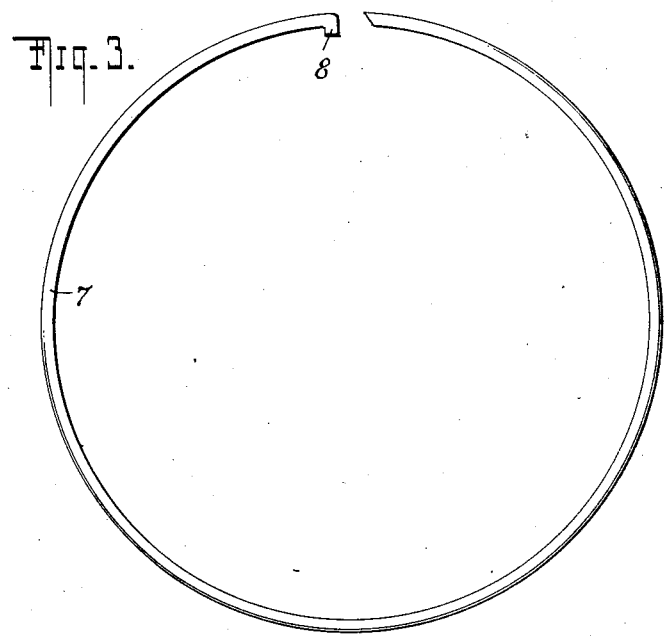
Figure 4:
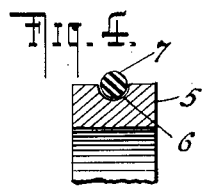

In the accompanying drawings, which for ilustrative and descriptive purposes show an embodiment of the invention, Figure 1 is a face view of a piston ring, partly in section, with my improvement included therein; Fig. 2 is an edge view; Fig. 3 is a detail view of an element of my invention and Fig. 4 is an enlarged detail section on the line 4—4 of Fig. 1.

In the drawings, 5 represents a piston ring which may be of any conventional type and which is outwardly elastic or, in other words, is resiliently expansible and exerts a tension in radially outward directions whereby the ring when in position on the piston is forced toward and maintained in engagement with the inner surface of the cylinder. The piston ring, as shown, is provided, in that outer face which is parallel with the axis of the ring, with an annular groove 6 in which is located a split annular member 7 preferably of wire of circular or other suitable cross-sectional form. The latter is inwardly elastic or, in other words, tends to contract to its normal position and is sprung into the groove 6 in which it is maintained by its own inherent elasticity; in other words, the piston ring 5 and the annular member 7 exert resilient tensions in opposite directions. The member 7 has a cross-sectional diameter sufficiently large to cause it to project outwardly beyond the piston ring 5 as shown in Figs. 1, 2 and 4 and is constructed of bronze or any other suitable friction metal capable of being drawn into a wire.

The frictional engagement of the member 7 with the surface of the groove 6 may be relied upon to prevent circumferential movement of said member 7 relatively to the ring 5 or suitable mechanical means may be provided for the purpose. For instance, as shown the member 7, at one end, may be formed with a projection 8 arranged to extend or fit into an aperture 9 located at an appropriate point on the ring 5. It will be understood that instead of being arranged as in the illustrated form in which the member 7 bridges the space between the opposed ends of the ring 5, said member 7 may be combined with said ring 5 in a manner to bring the ends of both into registry with each other or in any other way desired.

When operatively combined with the ring 5 the member 7 by projecting beyond the periphery thereof constitutes an efficient packing which is forced into engagement with the inner surface of the cylinder by the inherent elasticity of the ring 5 and which is itself maintained in connection with said ring by its own inherent elasticity exerted in an opposite direction. Because of the physical characteristics of the member 7 it quickly accommodates itself to the surface formation of the inner surface of said cylinder and efficiently seals the sliding joint between said piston and the cylinder wall; for the same reasons the degree of friction generated in using the device is reduced to a minimum.

The improvement may be combined with piston rings of any type, to render the same more efficient as packing elements for pistons and is particularly adapted for combination with piston rings which, through use or for other reasons, have lost their efficiency as packing devices. All that is necessary is to groove such a ring as shown and to apply the annular member 7 thereto, thereby rendering the otherwise useless ring fit for further service and avoiding the necessity for scrapping the same and the waste incident thereto.

I am aware that a wire has been spirally applied to a piston grooved to receive the same for instance as in Patent No. 56,699 of July 31, 1866; in such case, however, the wire is the equivalent of the present piston ring and by reason of its own inherent elasticity in an outward direction is pressed tight against the inner surface of the cylinder. In the invention herein described the wire is applied to the piston ring and its own inherent elasticity in an inward direction has nothing to do with maintaining it in engagement with the cylinder wall, this being accomplished by the inherent elasticity of the packing ring 5.

Various changes in the specific form shown and described may be made within the scope of the claims without departing from the spirit of my invention.

I claim:—

1. The combination of a piston ring having an annular peripheral groove and an annular packing wire sprung into said groove and projecting radially outward beyond said ring for engagement with the inner wall of an engine cylinder, said wire being elastic in an inward direction to clamp itself upon said ring and the latter being elastic in an outward direction to force said ring into an operative position of maximum efficiency.

2. The combination of a piston ring having an annular groove formed in its outer peripheral surface and provided with an aperture, an annular packing wire sprung into said groove and projecting radially outward beyond said ring for engagement with the inner surface of an engine cylinder to constitute a packing, said wire and ring being elastic in opposite directions and a projection on said wire extending into said aperture whereby circumferential movement of said wire relatively to said ring is prevented.

In testimony whereof I have hereunto set my hand.

PER AUGUST ANDERSON.